(12) United States Patent
MacKenzie

(10) Patent No.: US 9,141,256 B2
(45) Date of Patent: Sep. 22, 2015

(54) PORTABLE ELECTRONIC DEVICE AND METHOD THEREFOR

(75) Inventor: Stephen James MacKenzie, Ottawa (CA)

(73) Assignee: 2236008 Ontario Inc., Waterloo, Ontario (CA)

(*) Notice: Subject to any disclaimer, the term of this patent is extended or adjusted under 35 U.S.C. 154(b) by 154 days.

(21) Appl. No.: 13/240,230

(22) Filed: Sep. 22, 2011

(65) Prior Publication Data

US 2012/0075327 A1   Mar. 29, 2012

Related U.S. Application Data

(60) Provisional application No. 61/386,308, filed on Sep. 24, 2010.

(51) Int. Cl.
G09G 5/377 (2006.01)
G06F 3/0481 (2013.01)
G06F 3/0488 (2013.01)

(52) U.S. Cl.
CPC .......... *G06F 3/0481* (2013.01); *G06F 3/04883* (2013.01)

(58) Field of Classification Search
CPC ............... G09G 5/14; G09G 2340/10; G09G 2340/125; G06T 11/60; H04N 5/44504
USPC ................................................. 345/589, 629
See application file for complete search history.

(56) References Cited

U.S. PATENT DOCUMENTS

| | | | |
|---|---|---|---|
| 5,177,328 A | 1/1993 | Ito et al. | |
| 5,579,036 A | 11/1996 | Yates | |
| 5,579,487 A | 11/1996 | Meyerson et al. | |
| 5,754,809 A | 5/1998 | Gandre | |
| 5,861,874 A | 1/1999 | Joto | |
| 6,088,024 A | 7/2000 | Yamagata | |
| 6,437,836 B1 | 8/2002 | Huang et al. | |
| 6,473,069 B1 | 10/2002 | Gerpheide | |
| 6,819,315 B2 | 11/2004 | Toepke et al. | |
| 6,833,827 B2 | 12/2004 | Lui et al. | |
| 7,656,393 B2 | 2/2010 | King et al. | |
| 8,184,108 B2 | 5/2012 | Smits | |
| 8,238,876 B2 | 8/2012 | Teng et al. | |
| 8,291,344 B2 | 10/2012 | Chaudhri | |
| 8,355,698 B2 | 1/2013 | Teng et al. | |
| 8,456,447 B2 | 6/2013 | Newton | |

(Continued)

FOREIGN PATENT DOCUMENTS

| | | |
|---|---|---|
| CN | 1902599 A | 1/2007 |
| CN | 101052939 | 10/2007 |

(Continued)

OTHER PUBLICATIONS

International Patent Application No. PCT/CA2011/050590, Search Report dated Dec. 5, 2011.

(Continued)

*Primary Examiner* — Todd Buttram

(74) *Attorney, Agent, or Firm* — Alexander Anishchenko; Borden Ladner Gervais LLP

(57) ABSTRACT

A portable electronic device having a display and a processor is disclosed herein. The processor is configured to render an active application on substantially the entire display. In response to a status change, an alert is rendered in a visually insignificant area of the display.

20 Claims, 7 Drawing Sheets

(56) References Cited

U.S. PATENT DOCUMENTS

| | | | |
|---|---|---|---|
| 8,464,146 B2 | 6/2013 | Kang | |
| 8,477,082 B2 | 7/2013 | Lee et al. | |
| 8,533,844 B2 | 9/2013 | Mahaffey et al. | |
| 8,539,376 B2 | 9/2013 | Utsuki et al. | |
| 2002/0167489 A1* | 11/2002 | Davis | 345/157 |
| 2002/0175836 A1 | 11/2002 | Roberts | |
| 2004/0260427 A1* | 12/2004 | Wimsatt | 700/275 |
| 2005/0030291 A1 | 2/2005 | Yanagisawa | |
| 2005/0063149 A1 | 3/2005 | Shimamoto et al. | |
| 2005/0162406 A1 | 7/2005 | Ono et al. | |
| 2005/0289476 A1 | 12/2005 | Tokkonen | |
| 2006/0050061 A1 | 3/2006 | Aiken et al. | |
| 2006/0055685 A1 | 3/2006 | Rimas-Ribikauskas et al. | |
| 2006/0111182 A1 | 5/2006 | Nakanishi et al. | |
| 2006/0121985 A1 | 6/2006 | Nakanishi et al. | |
| 2006/0146055 A1 | 7/2006 | Chow et al. | |
| 2006/0238517 A1 | 10/2006 | King et al. | |
| 2007/0250787 A1 | 10/2007 | Kawahara et al. | |
| 2007/0262964 A1 | 11/2007 | Zotov et al. | |
| 2008/0001924 A1 | 1/2008 | de los Reyes et al. | |
| 2008/0007175 A1 | 1/2008 | Park | |
| 2008/0051642 A1* | 2/2008 | Krupnik | 600/302 |
| 2008/0165141 A1 | 7/2008 | Christie | |
| 2008/0222545 A1 | 9/2008 | Lemay et al. | |
| 2008/0238884 A1 | 10/2008 | Harish | |
| 2008/0273014 A1 | 11/2008 | Lowles et al. | |
| 2008/0284754 A1 | 11/2008 | Kao et al. | |
| 2009/0023395 A1 | 1/2009 | Chang et al. | |
| 2009/0046057 A1 | 2/2009 | Umezawa | |
| 2009/0058820 A1 | 3/2009 | Hinckley | |
| 2009/0061837 A1 | 3/2009 | Chaudhri et al. | |
| 2009/0085886 A1 | 4/2009 | Huang et al. | |
| 2009/0093315 A1 | 4/2009 | Matsunaga et al. | |
| 2009/0119678 A1 | 5/2009 | Shih et al. | |
| 2009/0135214 A1 | 5/2009 | Suzuki | |
| 2009/0146970 A1 | 6/2009 | Lowles et al. | |
| 2009/0189875 A1 | 7/2009 | Ma | |
| 2009/0237362 A1 | 9/2009 | Wu et al. | |
| 2009/0278795 A1 | 11/2009 | Hansen et al. | |
| 2009/0278806 A1 | 11/2009 | Duarte | |
| 2010/0007675 A1 | 1/2010 | Kang et al. | |
| 2010/0020029 A1 | 1/2010 | Park et al. | |
| 2010/0073301 A1 | 3/2010 | Yousefpor et al. | |
| 2010/0088641 A1 | 4/2010 | Choi | |
| 2010/0100067 A1 | 4/2010 | Pugliese, III | |
| 2010/0105443 A1 | 4/2010 | Vaisanen | |
| 2010/0107067 A1 | 4/2010 | Vaisanen | |
| 2010/0110019 A1 | 5/2010 | Ozias | |
| 2010/0134422 A1 | 6/2010 | Borras | |
| 2010/0137027 A1 | 6/2010 | Kim | |
| 2010/0145629 A1* | 6/2010 | Botich et al. | 702/23 |
| 2010/0175018 A1 | 7/2010 | Petschnigg et al. | |
| 2010/0175026 A1 | 7/2010 | Bortner et al. | |
| 2010/0185989 A1 | 7/2010 | Shiplacoff et al. | |
| 2010/0194667 A1 | 8/2010 | Lee et al. | |
| 2010/0199190 A1 | 8/2010 | Cadiz et al. | |
| 2010/0207911 A1 | 8/2010 | Newton | |
| 2010/0211872 A1 | 8/2010 | Rolston et al. | |
| 2010/0214218 A1 | 8/2010 | Vaisanen et al. | |
| 2010/0229090 A1 | 9/2010 | Newton et al. | |
| 2010/0231539 A1 | 9/2010 | Cruz-Hernandez et al. | |
| 2010/0245242 A1 | 9/2010 | Wu et al. | |
| 2010/0245275 A1 | 9/2010 | Tanaka | |
| 2010/0246104 A1 | 9/2010 | Park et al. | |
| 2010/0269048 A1 | 10/2010 | Pahlavan et al. | |
| 2010/0302172 A1 | 12/2010 | Wilairat | |
| 2011/0004845 A1* | 1/2011 | Ciabarra | 715/808 |
| 2011/0004888 A1 | 1/2011 | Srinivasan et al. | |
| 2011/0050607 A1 | 3/2011 | Park | |
| 2011/0164065 A1 | 7/2011 | Mate et al. | |
| 2011/0167382 A1* | 7/2011 | van Os | 715/800 |
| 2011/0205163 A1 | 8/2011 | Hinckley et al. | |
| 2011/0205178 A1 | 8/2011 | Yoshida et al. | |
| 2011/0208716 A1 | 8/2011 | Liu | |
| 2011/0209099 A1 | 8/2011 | Hinckley et al. | |
| 2011/0298743 A1 | 12/2011 | Machida et al. | |
| 2011/0298746 A1 | 12/2011 | Hotelling | |
| 2012/0021777 A1 | 1/2012 | Lazaridis et al. | |
| 2012/0056818 A1 | 3/2012 | Shafi et al. | |
| 2012/0231881 A1 | 9/2012 | Matsunaga | |
| 2013/0082978 A1 | 4/2013 | Horvitz et al. | |

FOREIGN PATENT DOCUMENTS

| | | |
|---|---|---|
| CN | 101432677 | 5/2009 |
| CN | 101438225 | 5/2009 |
| CN | 101527745 A | 9/2009 |
| EP | 2169521 | 3/2010 |
| EP | 2175359 | 4/2010 |
| EP | 2214085 A2 | 8/2010 |
| JP | 10-113969 | 5/1998 |
| KR | 1020090017517 | 2/2009 |
| WO | 2006020304 | 2/2006 |
| WO | 2007133483 | 11/2007 |
| WO | 2009088672 | 7/2009 |
| WO | 2009154862 | 12/2009 |
| WO | 2010092993 | 8/2010 |

OTHER PUBLICATIONS

Android 2.2 User Guide. Manual (online). Google Inc., May 20, 2010, retrieved from the internet Aug. 2, 2010, pp. 1-336.

Samsung Vibrant, a GALAXY S phone, Portable Quad-Band Mobile Phone User Manual [online]. Samsung Telecommunications America LLC, 2010, retrieved from the internet on Nov. 22, 2011, pp. 1-189.

Bragdon et al., "Experimental Analysis of Touch-Screen Gesture Designs in Mobile Environments", CHI 2011, May 7-12, 2011 (10 pages).

Roth et al., "Bezel Swipe: Conflict-Free Scrolling and Multiple Selection on Mobile Touch Screen Devices", CHI 2009, Apr. 4-9, 2009 (4 pages).

Canadian Patent Application No. 2,811,253, Office Action dated May 21, 2014.

Volker Roth et al. "Bezel Swipe: Conflict-Free Scrolling and Multiple Selection on Mobile Touch Screen Devices", CHI 2009, Apr. 4-9, 2009 (4 pages).

Canadian Patent Application Serial No. 2,812,288, Office Action dated Jun. 10, 2015.

German Patent Application Serial No. 112011101206.3, Office Action dated May 28, 2015.

Chinese Patent Application Serial No. 201180021869.9, Office Action dated May 20, 2015.

Chinese Patent Application Serial No. 201180045776.X, Office Action dated May 19, 2015.

Chinese Patent Application Serial No. 201180021999.2, Office Action dated Jun. 26, 2015.

* cited by examiner

PORTABLE ELECTRONIC DEVICE AND METHOD THEREFOR

CROSS REFERENCE TO RELATED APPLICATIONS

This application claims the benefit of priority of U.S. Provisional Patent Application No. 61/386,308 filed on Sep. 24, 2010, which is incorporated herein by reference.

FIELD OF TECHNOLOGY

The present disclosure relates to electronic devices including, but not limited to portable electronic, devices having touch-sensitive displays and the control of such devices and displays.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. A touch-sensitive display, also known as a touch-screen display, is particularly useful on handheld devices, which are small and have limited space for user input and output. The information rendered on the touch-sensitive displays may be modified depending on the functions and operations being performed.

Improvements in electronic devices with touch-sensitive displays are desirable.

SUMMARY

According to one aspect, a portable electronic device includes a display; and a processor configured to: render an active application on substantially the entire display; and in response to a status change, render an alert on the display without substantially visually obscuring the active application. The alert can be rendered in a visually insignificant area of the display, such as on a border of the display.

In some embodiments, the processor is further configured to, in response to a gesture for viewing details of the alert, rendering the details of the alert. In some embodiments, rendering the details of the alert comprises rendering a status area.

A visual characteristic of the alert can depend on a characteristic of the status change.

The characteristic of the status change can be a type of status change or a priority level. In some embodiments, the characteristic includes both a type of status change and a priority level. In some embodiments, a type of status change and priority level are separate characteristics.

The visual characteristic can be a color or an animation rate. Some embodiments utilize both a color and an animation rate.

According to another aspect, a method of rendering an alert on a portable electronic device having a display, the method comprising: rendering an active application on substantially the entire display; in response to a status change, rendering an alert on the display without substantially visually obscuring the active application. The alert can be rendered in a visually insignificant area of the display, such as on a border of the display.

In some embodiments, the method further comprises: in response to a gesture for viewing details of the alert, rendering the details of the alert.

A visual characteristic of the alert can dependent on a characteristic of the status change.

The characteristic of the status change can be a type of status change or a priority level.

The visual characteristic can be a color or an animation rate.

According to another aspect, a non-transitory machine-readable memory storing statements and instructions for execution by a processor for rendering an active application on substantially an entire display of a portable electronic device; and in response to a status change, rendering an alert on the display without substantially visually obscuring the active application.

Other aspects and features of the present disclosure will become apparent to those ordinarily skilled in the art upon review of the following description of example embodiments in conjunction with the accompanying figures.

BRIEF DESCRIPTION OF THE DRAWINGS

Embodiments of the present disclosure will now be described, by way of example only, with reference to the accompanying figures.

DETAILED DESCRIPTION

Figure 1:
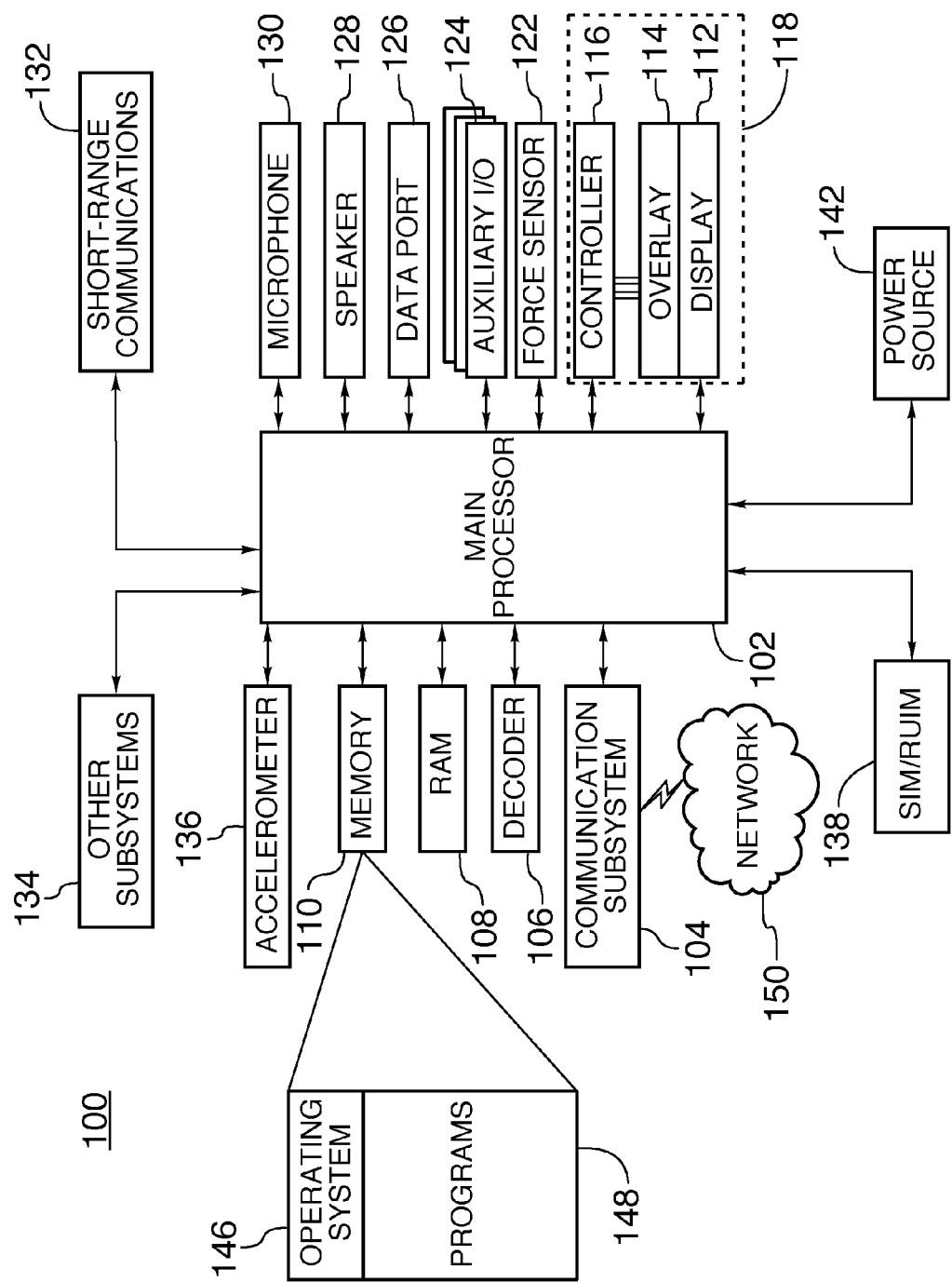
FIG. 1 is a block diagram of a portable electronic device in accordance with an example embodiment.

The following describes an electronic device that includes a display and a processor. The processor is configured to render an active application on substantially the entire display. In response to a status change, an alert is rendered in a visually insignificant area of the display. In some embodiments, the term "render" is used interchangeably with the verb "display".

For simplicity and clarity of illustration, reference numerals may be repeated among the figures to indicate corresponding or analogous elements. Numerous details are set forth to provide an understanding of the embodiments described herein. The example embodiments may be practiced without these details. In other instances, well-known methods, procedures, and components have not been described in detail to avoid obscuring the embodiments described. The description is not to be considered as limited to the scope of the example embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, PDAs, wirelessly enabled notebook computers, tablet computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. The portable electronic device 100 presently described optionally includes a communication subsystem 104 and a short-range communications 132 module to perform various communication functions, including data and voice communications. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, an auxiliary input/output (I/O) subsystem 124, a data port 126, a speaker 128, a microphone 130, short-range communications 132, and other device subsystems 134. User-interaction with a graphical user interface presented on display 112 is performed through the touch-sensitive overlay 114. The processor 102 interacts with the touch-sensitive overlay 114 via the electronic controller 116. Information, such as text, characters, symbols, images, icons, and other items that may be rendered or rendered on a portable electronic device, is rendered on the touch-sensitive display 118 via the processor 102. The processor 102 may interact with an orientation sensor such as an accelerometer 136 that may be utilized to detect direction of gravitational forces or gravity-induced reaction forces. The processor 102 may also interact with one or more force sensors 122 so as to determine, for example, the orientation of the portable electronic device 100.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. The controller 116 and/or the processor 102 may detect a touch by any suitable contact member on the touch-sensitive display 118. Similarly, multiple simultaneous touches are detected.

One or more gestures are also detected by the touch-sensitive display 118. A gesture, such as a swipe, also known as a flick, is a particular type of touch on a touch-sensitive display 118 that begins at an origin point and continues to a finishing point. A gesture may be identified by attributes of the gesture, including the start point, the end point, the distance traveled, the duration, the velocity, and the direction, for example. A gesture may be long or short in distance and/or duration. Two points of the gesture may be utilized to determine a direction of the gesture.

In some embodiments, optional force sensor(s) 122 may be disposed in any suitable location, for example, between the touch-sensitive display 118 and a back of the portable electronic device 100 to detect a force imparted by a touch on the touch-sensitive display 118. The force sensor 122 may be a force-sensitive resistor, strain gauge, piezoelectric or piezoresistive device, pressure sensor, or other suitable device. Force as utilized throughout the specification refers to force measurements, estimates, and/or calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, rendered or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
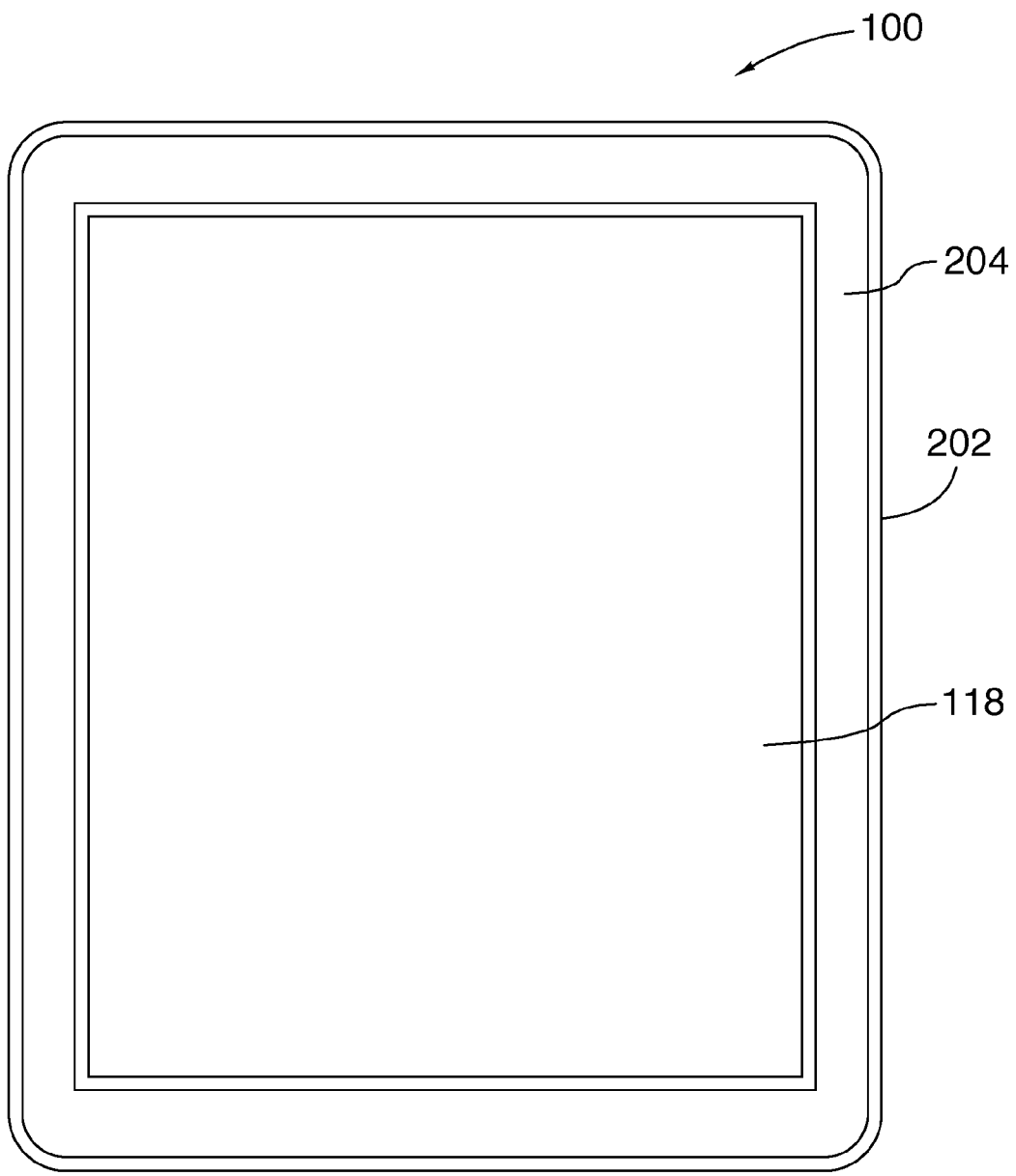
FIG. 2 is a front view of an example of a portable electronic device according to an example embodiment.

A view of an example of the portable electronic device 100 is shown in FIG. 2. The portable electronic device 100 includes a housing 202 that encloses components such as shown in FIG. 1. The housing 202 may include a front 204, and a back and sidewalls (not shown). The front 206 of the housing includes openings in which the touch-sensitive display 118 is exposed.

In known graphical user interfaces a portion of the display is typically dedicated to rendering status and/or notification information. Accordingly, this portion of the display is therefore not available for rendering an active application. The term active application refers to an application having a user interface that is the focus of the display. There is a trend for some portable electronic devices to become smaller and given that a smaller device has less room for a display, the display of such a device will also generally be smaller. There is also a trend for some portable electronic devices to become more sophisticated and therefore such devices may have more status and notification information to render. In both cases, there is a growing contention for display real estate between active applications and status/notifications information.

In contrast to known devices, some embodiments disclosed herein relate to a portable electronic device in which no portion of the display is dedicated to or reserved for rendering system wide and/or non-application status and notification information. Accordingly, in the example embodiments described herein, status/notification information is not occluded by, for example, the graphical user interface of the active application. The term status as used herein will describe any appropriate status or notification information. Status information includes any appropriate information such as for example, but not limited to, the number of unread email messages, whether a new email message has been received, number of new text messages, whether a new text message has been received, number of unheard voicemail messages, number of unread social networking messages, current time and date, battery status, signal strength; and any other suitable information.

The term status indicator as used herein will describe any appropriate indicator that indicates that status information is ready to be rendered. In some embodiments, when a status indicator is asserted, an alert is rendered to the user. In various embodiments, the status indicator is asserted by the operating system or another application when there is a status change. A status change includes but is not limited to any change in the operation of device 100 or any notification that may originate from any suitable application. For example, in some embodiments, a status change includes, but is not limited to, the battery level falling below a threshold or the receipt of a new email, text message, or voice mail. In some embodiments, in the absence of an asserted status indicator, the entire display is utilized by an active application.

Figure 3:
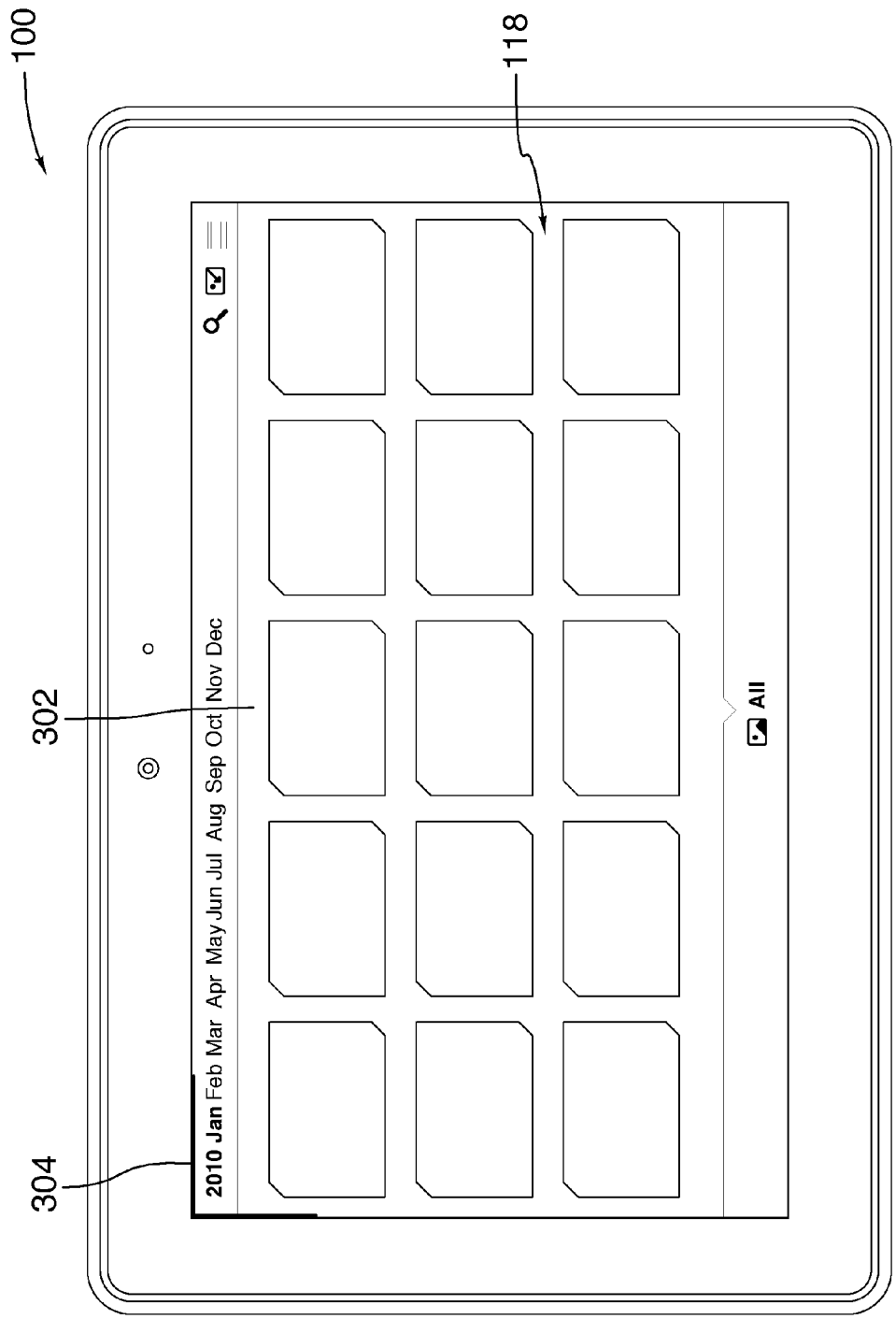
FIG. 3 is a front view of the portable electronic device of FIG. 2 rendering an active application and an alert according to an example embodiment.

Reference is now made to FIG. 3, which is a front view of portable electronic device 100 rendering an active application 302 on display 118. In the view shown, active application 302 occupies substantially the entire area of display 118. FIG. 3 also illustrates an alert 304 that is rendered at a corner of display 118.

In some embodiments, the alert 304 is rendered on display 118 as opposed to through the use of a separate indicator on device 100, such as a light emitting diode (LED). In some embodiments, the alert 304 is rendered on display 118 such that it does not substantially interfere with or obscure the rendering of the active application 302. In some embodiments, the alert 304 is rendered in a visually insignificant area of display 118, such as at a portion of the border of the active application's graphical user interface. As used herein the term visually insignificant area refers to an area that is not visually significant from the perspective of the active application 302 in relation to display 118. A visually insignificant area can be visually altered without substantially changing the rendering of the active application 302, such as for example, visually obscuring the rendering of the active application 302, interfering with the use of the active application 302 user interface, or preventing the active application 302 from usefully occupying a significant portion of the display. In some embodiments, the significance of a portion of display 118 is determined by the magnitude of the area of that portion in relation to display 118 and/or by the location of that portion within the overall display 118. In some embodiments, the significance of a portion of display 118 is determined by the magnitude of the area of that portion in relation to the magnitude of the portion of display 118 used to render an active application and/or by the location of that portion in relation to the portion of display 118 utilized to render an active application. In some embodiments, such as that illustrated in FIG. 3, a visually insignificant portion of display 118 corresponds to an edge of display 118. In some examples, the edge of the display 118 is a visually insignificant area where no active application, or a portion thereof, is rendered.

Figure 4:
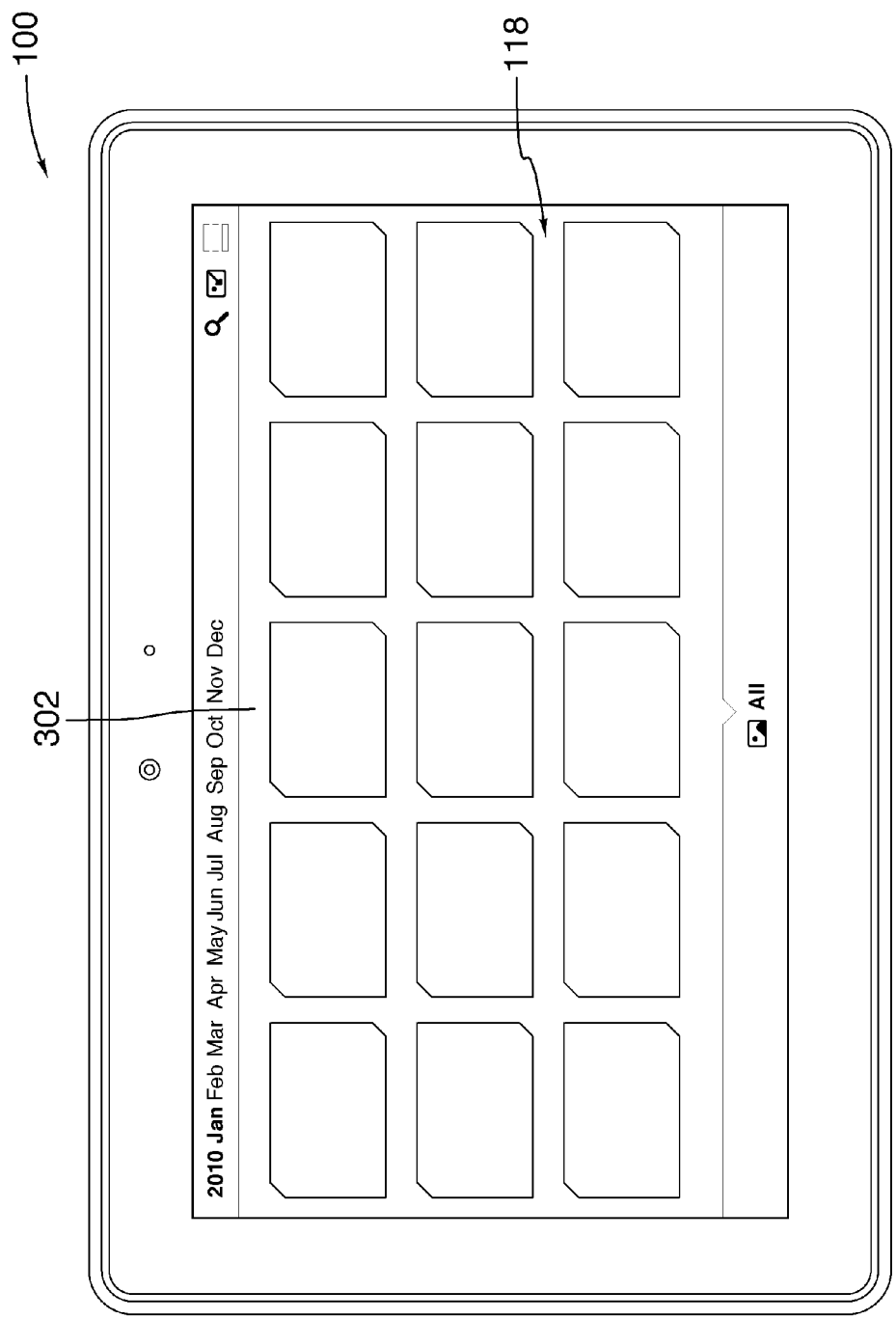
FIG. 4 is a front view of the portable electronic device of FIG. 2 rendering an active application according to an example embodiment.

Known portable electronic devices generally reserve portions of a display for rendering status and notification information in visually significant areas of the display. In contrast, some embodiments disclosed herein do not reserve portions of the display for rendering status information to the exclusion of an active application 302. FIG. 4 illustrates a front view of portable electronic device 100 rendering an active application 302 on display 118. As illustrated in FIG. 4, various embodiments disclosed herein do not utilize a banner, system tray, dashboard, dashboard summary, dialog box, or status bar, all of which utilize dedicated space on a display. Thus, while with known portable electronic devices certain portions of the display are not available for rendering of an active application 302, in various embodiments disclosed herein, substantially the entire display is available for rendering an active application 302 in the absence of an alert 304. In addition, for some embodiments, even when an alert 304 is rendered no visually signification portion (e.g. area) is occupied by alert 304.

For example, in some embodiments, the alert 304 is rendered in a small region or area of the display adjacent to the periphery of the display of the active application 302, such as for example, but not limited to, along the border of the display or a window of the application. In some embodiments, as illustrated in FIG. 3, the alert 304 is a slim 'L' shaped graphic placed in any corner of the display with the arms of the 'L' shape extending along the two edges of the display from the corner. In some such embodiments, the alert 304 is comprised of lines and occupies substantially no area on the display. In other embodiments, the alert 304 is rendered in a relatively small area along the periphery of the display.

In other embodiments, the alert 304 may replace or overlap a portion of the rendering of the active application 302. In some embodiments, the alert 304 is substantially transparent or translucent such that when it is rendered over the active application 302, the active application 302 is still visible under the alert 304.

In some embodiments, the alert 304 is rendered in an attention attracting or contrasting color from the rest of the active application 302. In some embodiments, the alert 304 flashes, pulsates or is otherwise animated. In some embodiments where the alert 304 is animated, the animation is continuous. In other embodiments the animation is periodic. In other embodiments, the animation occurs initially on assertion of the indicator and is followed by a non-animated rendering of the alert. In some embodiments where the alert 304 pulses, the pulse rate is used to indicate the priority or importance of the indicator that triggered the alert 304. For example, in some embodiments a quick pulse rate indicates a high priority and a slow or non-pulsing alert indicates a low priority. In some embodiments, the number of pulses is used to indicate an alert quantity. For example, in some embodiments, the number of pulses is used to indicate a number of unviewed messages. In some embodiments, the pulses occur in a repeating pattern. In some embodiments, an audible notification such as a tone or ring tone is activated in conjunction with the alert 304. In such embodiments, the audible notification can be a single notification or continuous.

In some embodiments, the location of the alert 304 on display 118 is a function of a variety of factors. In some embodiments, the location of the alert 304 varies depending on the type of indicator that triggered the alert 304. For example, a different location maybe used for an alert 304 to indicate new mail than for an alert to indicate that a new voicemail is available. In some embodiments, the user can activate a function or feature of device 100 upon interacting with the alert 304 by a touch or gesture. In addition, in some embodiments, the location of the alert 304 is used to provide an indication of the type of gesture required to access details associated with the alert. For example, in some embodiments, an alert 304 in the top right corner of the display indicates a swipe gesture and an alert 304 at the bottom right corner indicates a tap gesture.

In some embodiments, the color of the alert 304 is a function of any appropriate characteristic of the indicator or status change associated with the indicator. For example, in some embodiments, the color varies depending on factors such as the type, priority or importance of the indicator or status change associated with the indicator that triggered the alert 304.

In general, in various embodiments, any appropriate visual characteristic of the alert 304 can depend on any appropriate characteristic of the status change. The visual characteristics include any suitable visual characteristic mentioned above including, but not limited to, color, location, animation, animation pattern, and animation rate. Animation rate includes, but is not limited to, a pulse rate and flash rate. Animation pattern includes, but is not limited to, a number flashes. The characteristic of the status change includes any appropriate characteristic mentioned above, including, but not limited to, priority, importance, type of status, and number of status changes.

Figure 5:
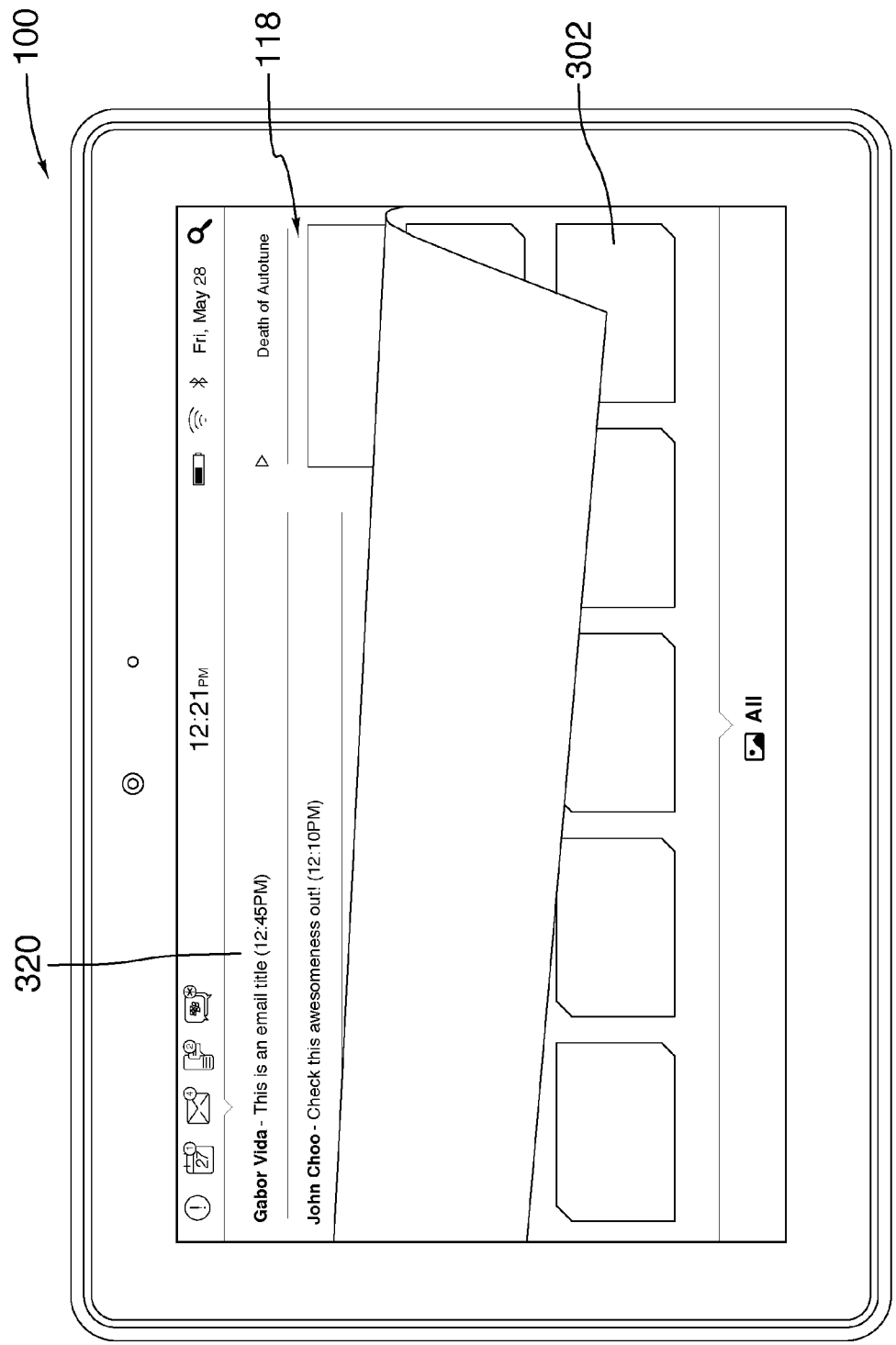
FIG. 5 is a front view of the portable electronic device of FIG. 2 rendering a partial view of a status area according to an example embodiment.

In various embodiments, the details of the alert 304 are rendered in any appropriate manner including but not limited to a "peek" view, a pop-up view or a full status view. In some embodiments the peek view is, for example, a corner curl of the active application 302 as illustrated in FIG. 5 and described in greater detail below.

In some embodiments, user input, such as a gesture, is applied to dismiss the alert 304 without viewing the details associated with the alert. In various embodiments, the dismissive gesture is any appropriate gesture such as, for example, an outward swipe over the alert 304.

The navigational commands that cause the user interface transitions described above and further herein are not limited to swiping gestures as described in the examples. In various embodiments, the navigational commands take the form of other contact (e.g. touch) or gestures, pointing device inputs, voice commands, keyboard inputs and other similar user inputs.

In some embodiments, in response to the alert 304, the input of an appropriate gesture causes a more detailed status area 320 to be rendered on display 118. In some embodiments, the gesture to access details of the alert 304 is applied to the alert 304. In some embodiments, the gesture is any suitable gesture including but not limited to a swipe. In various embodiments, the status area 320 is rendered in any appropriate manner. In some embodiments, different types of gestures are used to render the status area 320 in different ways. For example, in some embodiments, a short swipe gesture causes a partial view of the status area 320 to be rendered while a longer swipe causes a larger view of the status area 320 to be rendered.

Reference is now made to FIG. 5, which is a front view of portable electronic device 100 rendering a partial view of status area 320. In some embodiments, the view in FIG. 5 is accessed by performing a short swipe. As can be seen, in some embodiments, the partial view of status area 320 is rendered by causing the active application 302 to curl over to expose the status area 320. In this manner the swipe applied to display 118 mimics the swiping of a physical page to curl it over to expose what is behind the page.

The embodiment illustrated in FIG. 5 corresponds to one in which, in response to different navigational commands, the user interface may cause different sheet-like transitions to occur between the rendering of an active application 302 and a status area 320 that renders details associated with the alert 304. However, it should be understood that any appropriate method can be used for transitioning from the active application 302 to a view of the details associated with the alert 304, such as for example, status area 320.

In some embodiments, the active application 302 remains partially curled over until another gesture is applied. In some embodiments, a short swipe in the opposite direction causes the active application 302 to curl back and a short swipe in the direction of the curl causes the active application 302 to fully curl to reveal the entire status area 320. In other embodiments, the active application 302 remains partially curled temporarily and then snaps back to its previous position. In some embodiments, the animation and timing of the snap back is executed so as to mimic the inertia and spring of a physical page.

Figure 6:
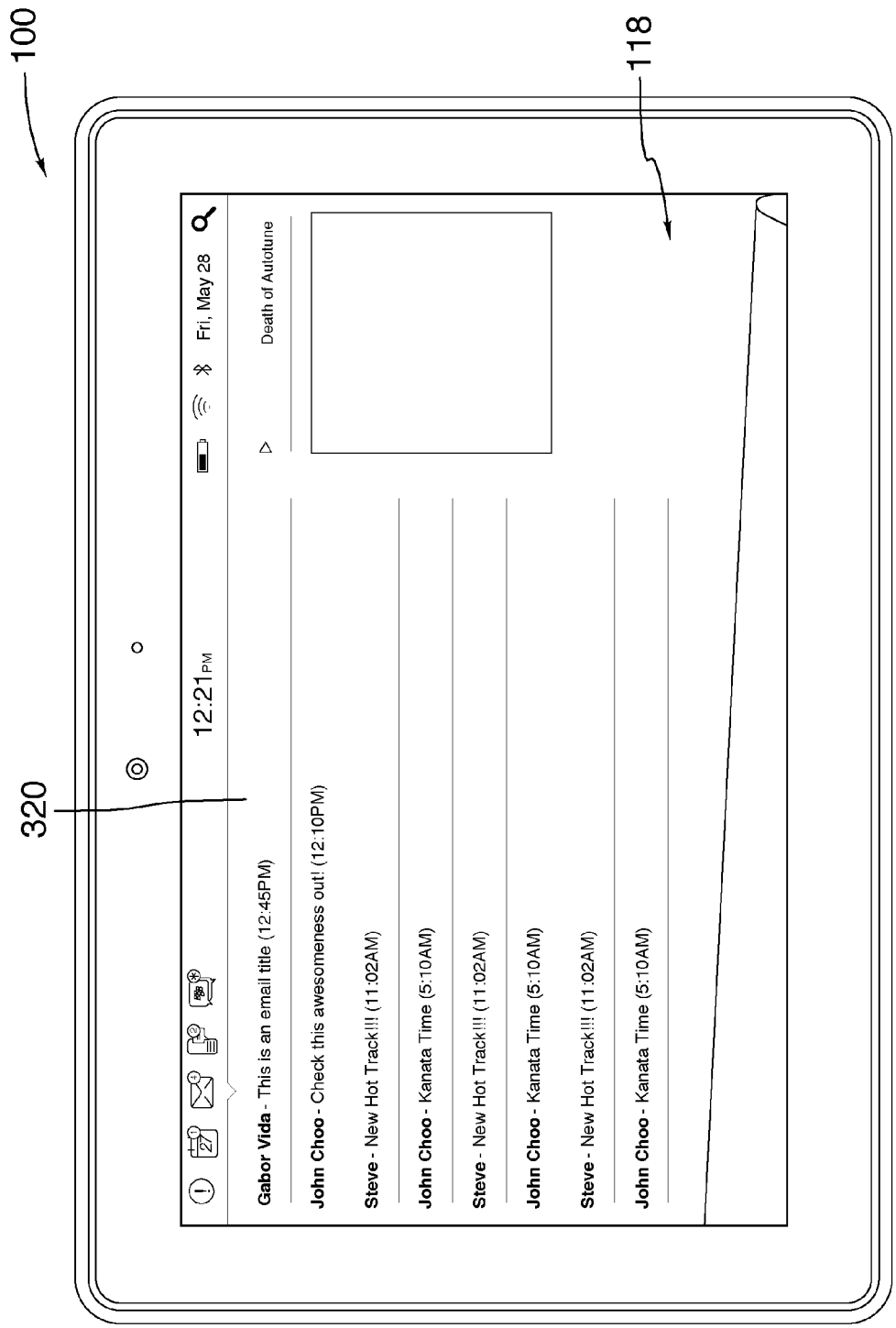
FIG. 6 is a front view of the portable electronic device of FIG. 2 rendering a large view of a status area according to an example embodiment.

Reference is now made to FIG. 6, which is a front view of portable electronic device 100 rendering a large view of status area 320. In some embodiments, a different gesture, such as for example, a longer swipe, causes the larger view of status area 320 to be rendered. As can be seen from FIG. 6, the view of the active application 302 is almost completely curled.

In some embodiments, the active application 302 remains curled over until another gesture is applied. In some embodiments, a swipe in the opposite direction causes the active application 302 to curl back. In other embodiments, the active application 302 remains partially curled temporarily and then snaps back to its previous position thereby mimicking the inertia and spring of a physical page.

In some embodiments, a plurality of views of status area 320 at varying degrees of exposure is provided. For example, one or more partial views and a large or full view may be viewed. In some embodiments, a plurality of discrete views are provided. In other embodiments, the views appear to be continuous such that the degree to which status area 320 is exposed is determined by the gesture applied. For example, in some embodiments, when an object, such as for example, a finger, thumb, appendage, or other items, for example, a stylus, pen, or other pointer, is dragged across display 118, the curl of active application 302 follows the motion of the object in a manner that appears to be continuous such that the degree of the curl does not appear to increase or decrease in discrete jumps.

Although FIGS. 5 and 6 illustrate the active application 302 curling to reveal status area 320, in other embodiments, status area 320 is revealed in any other appropriate manner. For example, in some embodiments, status area 320 slides into place. In other embodiments, status area 320 pops up as a menu having items corresponding to details of the alert 304. In other embodiments, status area 320 is rendered on substantially the entire display 118.

In various embodiments, status area 320 includes any appropriate status and notification information. For example, in some embodiments, status area 320 includes information such as the number of unread email messages, number of new text messages, number of unheard voicemail messages, and number of unread social networking messages; message previews with sender, subject and receipt date/time; current time and date, battery status, signal strength; multimedia player information (artist, album name, album artwork, song/track name, duration, play-time, volume, play list name). These are examples only and, in other embodiments, other appropriate status information is rendered in status area 320, including information from the operating system, pre-installed applications, and third party applications.

In some embodiments, status area 320 varies depending on the alert 304 in response to which the status area 320 is access. Thus for example, if status area 320 is accessed in response to an alert 304 triggered by a new email being received, then status area 320 may have an email focus. Accordingly, in such embodiments, the information rendered in status area 320 may generally pertain to emails. In some embodiments, a status area 320 with a particular focus also renders additional information that is not related to its focus. For example, in some embodiments, an email focused status area contains other suitable status information such as, for example, battery power level, time, date and signal power, as well as any other suitable information. In other embodiments, status area 320 is a general status area and does not vary depending on the type of alert.

Figure 7:
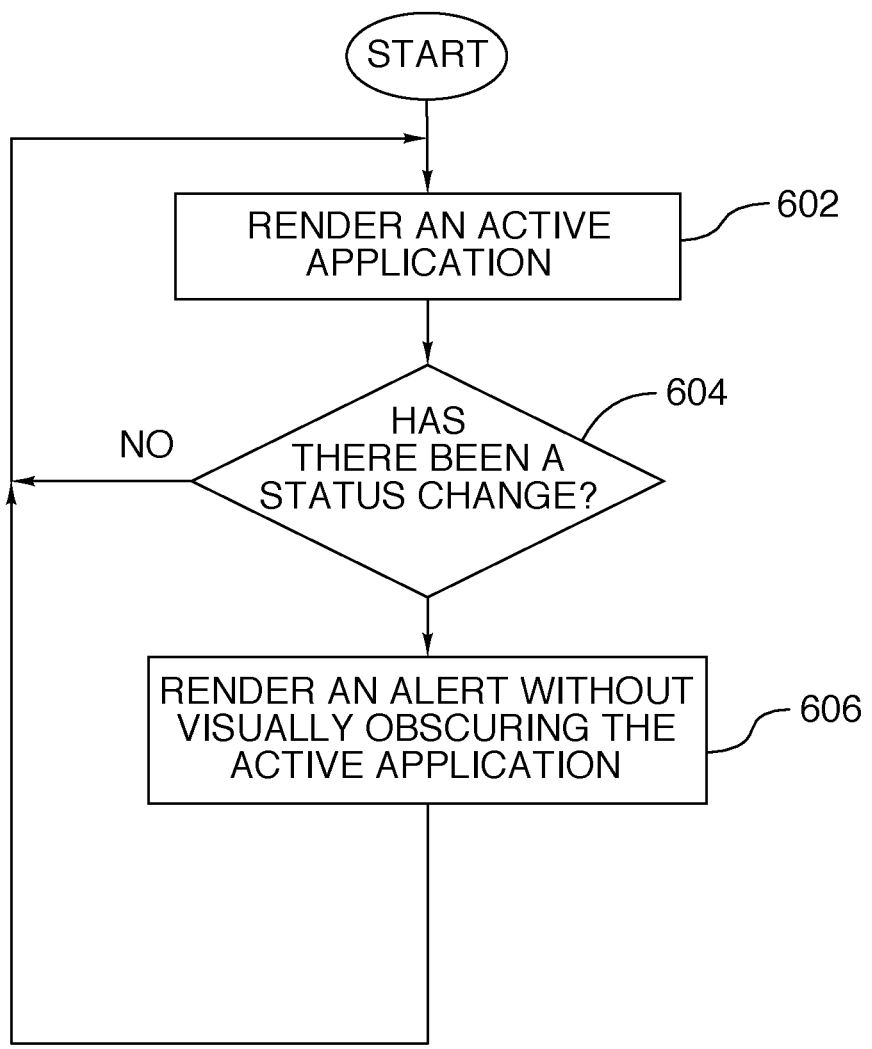
FIG. 7 is a flowchart diagram illustrating a method according to an example embodiment.

Reference is now made to FIG. 7, which is a flowchart diagram of a method according to some embodiments disclosed herein. At step 602 an active application 302 is rendered on display 118. In some embodiments, no areas of the display are reserved for the rendering of alert or status information and the active application 302 has available to it substantially all of the display 118 area. At step 604, it is determined if there has been as status change. If not, then step 602 is repeated. If yes, then step 606 is executed. At step 606, an alert 304 is rendered on display 118 such that the alert 304 does not substantially obscure the rendering of the active application 302. In some embodiments, the assertion of the alert 304 does not change the user input focus of the device. For example, user inputs such as gestures may continue to be directed to the active application 302.

In contrast to known portable electronic devices, various embodiments described herein do not reserve portions of the display 118 for rendering status and notification information. For example, various embodiments disclosed herein do not utilize a banner, system tray, dashboard, dashboard summary, dialog box, or status bar, all of which utilize space on a display 118. Thus, while with known portable electronic devices certain portions of the display 118 are not available for the rendering of an active application 302, in various embodiments disclosed herein substantially, the entire display 118 is available for rendering an active application 302.

In addition, in various embodiments, the use of alerts, as described herein, does not pre-empt user input focus, such as would, for example, occur with the use of a modal alert window. The use of such a modal alert window would shift the user input focus to the alert window when the alert is rendered. This would result in any inputs applied to the device to be interpreted as being applied to the alert window and not the active application 302. For example, the input mode of a word processing application results in typed characters being inserted in the document while carriage return signifies the end of paragraph and inserts an empty new paragraph. While the user is typing, when the operating system pops-up a dialog box for a system error (e.g. low battery) the input focus is changed to the dialog box which has a different mode where typed characters are thrown away and a carriage return signifies acceptance of the selected button (e.g. 'OK'). Because the dialog box threats the same key presses differently than the word processor does, it is in a different mode and therefore this user interface paradigm is modal. In contrast, in some embodiments described herein, the assertion of an alert 304 is modeless and therefore even in the presence of an alert 304, at least some inputs will continue to be interpreted as applying to the active application 302.

In some embodiments, the alert 304 itself provides an indication or hint as to a gesture that should be applied to access the detailed information associated with the alert 304. For example, in some embodiments, the gesture is to be made proximate to or over the alert 304.

In various embodiments, the use of the alerts 304 as described herein do not interfere with view of an active application 302. This is in contrast to known methods and systems where pop-up windows or dialog box are rendered in order to provide the user with some sort of status or notification information. The use of known methods can interfere or obscure the view of what is rendered on the display 118.

In various embodiments described herein, multiple alerts 304 can be rendered concurrently by using different areas of the display 118. In addition, in various embodiments, this is achieved without obscuring the rendering of the active application 302.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A portable electronic device comprising:
    a display; and
    a processor configured to:
        render an active application on substantially the entire display without reserving a substantial portion of the display for displaying status indications to the exclusion of the active application; and
        in response to any one of a plurality of status changes, render an alert on the rendered active application at a location on the periphery of the display without substantially visually obscuring the active application, the alert comprising an object rendered at the periphery of the display, the alert being devoid of text and pictorial representations, a visual characteristic of the alert indicating a characteristic of the status change;
    wherein a function of the device is activated by a gesture applied to the alert; and
    wherein the location on the periphery of the display indicates the gesture to be applied to the alert to activate the function.

2. The device of claim 1, wherein the alert is rendered over a border of the active application.

3. The device according to claim 1, wherein the processor is further configured to:
    in response to a user input for viewing details of the alert, render the details associated with the alert.

4. The device of claim 3, wherein rendering the details of the alert comprises rendering a status area.

5. The device of claim 1, wherein the rendered alert occupies substantially no area on the display.

6. The device of claim 1, wherein visual characteristic comprises a number of times that the alert pulsates; and wherein the number of times indicates an alert quantity.

7. The device of claim 1, wherein visual characteristic comprises an animation rate of the alert.

8. The device of claim 7, wherein the characteristic of the status change is selected from the group consisting of: a type of status change and a priority level.

9. The device of claim 1, wherein the location indicates a characteristic of a status change.

10. The device of claim 9, wherein the characteristic of the alert is selected from the group consisting of: a type of status change and a priority level.

11. A method of rendering an alert on a portable electronic device having a display, the method comprising:
    rendering an active application on substantially the entire display without reserving a substantial portion of the display for displaying status indications to the exclusion of the active application; and
    in response to any one of a plurality of status changes, rendering an alert on the rendered active application on at a location on the periphery of display without substantially visually obscuring the active application, the alert comprising an object rendered at the periphery of the display, the alert being devoid of text and pictorial representations, a visual characteristic of the alert indicating a characteristic of the status change;
    wherein a function of the device is activated by a gesture applied to the alert; and
    wherein the location on the periphery of the display indicates the gesture to be applied to the alert to activate the function.

12. The method of claim 11, wherein the alert is rendered over a border of the active application.

13. The method according to claim 11, further comprising:
    in response to a user input for viewing details of the alert, rendering the details associated with the alert.

14. The method of claim 11, wherein visual characteristic comprises a number of times that the alert pulsates; and wherein the number of times indicates an alert quantity.

15. The method of claim 11, wherein visual characteristic comprises an animation rate of the alert.

16. The method of claim 15, wherein the characteristic of the status change is selected from the group consisting of: a type of status change and a priority level.

17. The method of claim 11, wherein the location indicates a characteristic of a status change; and wherein the characteristic of the alert is selected from the group consisting of: a type of status change and a priority level.

18. A non-transitory machine-readable memory storing statements and instructions for execution by a processor for
    rendering an active application on substantially an entire display of a portable electronic device without reserving a substantial portion of the display for displaying status indications to the exclusion of the active application; and
    in response to any one of a plurality of status changes, rendering an alert on the rendered active application at a location on the periphery of the display without substantially visually obscuring the active application, the alert comprising an object rendered at the periphery of the display, the alert being devoid of text and pictorial representations, a visual characteristic of the alert indicating a characteristic of the status change;
    wherein a function of the device is activated by a gesture applied to the alert; and
    wherein the location on the periphery of the display indicates the gesture to be applied to the alert to activate the function.

19. The machine-readable memory of claim 18, wherein the processor is further configured to:
    in response to a user input for viewing details of the alert, render the details associated with the alert.

20. The machine-readable memory of claim 19, wherein rendering the details of the alert comprises rendering a status area.

* * * * *